United States Patent
Sargor et al.

(10) Patent No.: US 8,144,698 B2
(45) Date of Patent: Mar. 27, 2012

(54) SCALABLE DATA FORWARDING TECHNIQUES IN A SWITCHED NETWORK

(75) Inventors: Chandramouli Sargor, Sunnyvale, CA (US); Albert Jining Tian, Cupertino, CA (US); Rajesh Ishwariah Balay, Los Altos, CA (US)

(73) Assignee: Ericsson AB, Stockholm (SE)

( * ) Notice: Subject to any disclaimer, the term of this patent is extended or adjusted under 35 U.S.C. 154(b) by 228 days.

(21) Appl. No.: 11/450,027

(22) Filed: Jun. 9, 2006

(65) Prior Publication Data

US 2007/0288653 A1 Dec. 13, 2007

(51) Int. Cl.
*H04L 12/56* (2006.01)
(52) U.S. Cl. .................................. 370/389; 370/236
(58) Field of Classification Search ............... 370/401, 370/463, 395, 354, 338, 216, 400, 252; 398/54; 709/218, 246; 713/201; 726/12
See application file for complete search history.

(56) References Cited

U.S. PATENT DOCUMENTS

| | | | |
|---|---|---|---|
| 6,856,591 B1 * | 2/2005 | Ma et al. | 370/216 |
| 2004/0098618 A1 * | 5/2004 | Kim et al. | 713/201 |
| 2004/0141468 A1 * | 7/2004 | Christensen et al. | 370/252 |
| 2004/0252995 A1 * | 12/2004 | Ovadia et al. | 398/54 |
| 2006/0184645 A1 * | 8/2006 | Monette et al. | 709/218 |
| 2006/0184695 A1 * | 8/2006 | Monette et al. | 709/246 |
| 2007/0008982 A1 * | 1/2007 | Voit et al. | 370/401 |
| 2007/0047557 A1 * | 3/2007 | Martini et al. | 370/395.53 |
| 2007/0079366 A1 * | 4/2007 | Geffner | 726/12 |
| 2008/0192756 A1 * | 8/2008 | Damola et al. | 370/400 |

OTHER PUBLICATIONS

International Preliminary Report on Patentability, Application No. PCT/US2007/006419, dated Dec. 10, 2008.
Notification of Transmittal of the International Search Report and the Written Opinion of te International Searching Authority, or the Declaration for International Application No. PCT/US07/06419, filed on Mar. 13, 2007, and mailed on Apr. 9, 2008, pp. 14 total.

* cited by examiner

*Primary Examiner* — Kwang B Yao
*Assistant Examiner* — Syed M Bokhari
(74) *Attorney, Agent, or Firm* — Blakely Sokoloff Taylor & Zafman, LLP

(57) ABSTRACT

Scalable data forwarding techniques in a switched network are described herein. In one embodiment, an example of a process for forwarding data includes, in response to a first packet received from a first local node over a local area network (LAN) and destined to a first remote node over a provider network, a provider edge (PE) device of the provider network substituting a source MAC (media access control) address of the first packet with a virtual MAC address associated with the PE device, and the PE device transmitting the first packet having the virtual MAC address as the source MAC address to the first remote node over the provider network. Other methods and apparatuses are also described.

20 Claims, 8 Drawing Sheets

SCALABLE DATA FORWARDING TECHNIQUES IN A SWITCHED NETWORK

FIELD OF THE INVENTION

The present invention relates generally to network communications. More particularly, this invention relates to scalable data forwarding in a switched network.

BACKGROUND

A multipoint-to-multipoint communications network typically has scalability. challenges as the number of end points and/or local area network (LAN) segments increases dramatically. For example, a VPLS (virtual private LAN service) network faces scalability challenges in two dimensions: (a) in a LDP (label distribution protocol) based signaling plane due to the requirement of a full mesh among VPLS peers; and (b) in the data forwarding plane due to the requirement that each VPLS instance be aware of all the MAC (media access control) addresses in that VPLS instance. Although (a) can be addressed using spoke connectivity as defined by hierarchical VPLS; however, even with hierarchical VPLS, each VPLS instance still needs to maintain the entire MAC table for that instance which presents significant scaling problems for a large VPLS network.

FIG. 1 is a block diagram illustrating a typical network configuration. FIG. 1 shows a single LAN that is geographically distributed across three provider edge (PE) boxes. All hosts connected to the LAN (regardless of the attachment PE) belong to the same IP network. The PE devices provide network level layer 2 bridging/VPLS services to interconnect the distributed LAN segments. Referring to FIG. 1, local nodes 108-113 are part of the same LAN—bridging across the LAN segments is provided by their attachment PE devices—PE A, PE B, and PE C respectively. Typically, in a layer 2 (e.g., MAC layer) switching configuration, each of the PE devices (A, B, and C) has to maintain a MAC table to maintain all of the MAC addresses of all nodes 108-113, in order to properly forward data from a source MAC address to a destination MAC address of any one of nodes 108-113. As the number of nodes 108-113 increases significantly, the MAC table maintained within each PE device (e.g., PE devices A, B, and C) will significantly increase leading to scalability issues. Moreover, addition of another LAN segment will impact all the PE devices in the network as they now will have to learn all the MAC addresses that belong to the newly added LAN segment.

SUMMARY OF THE DESCRIPTION

Scalable data forwarding techniques in a switched network are described herein. In one embodiment, an example of a process for forwarding data includes, in response to a first packet received from a first local node over a local area network (LAN) and destined to a first remote node over a provider network, a provider edge (PE) device of the provider network substituting a source MAC (media access control) address of the first packet with a virtual MAC address associated with the PE device, and the PE device transmitting the first packet having the virtual MAC address as the source MAC address to the first remote node over the provider network.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Scalable data forwarding techniques in a switched network are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, each PE device of a provider network utilizes a virtual MAC address assigned to each interface of a VPLS/bridge instance on the respective PE device to represent all of the local MAC addresses associated with that interface, without exposing the physical MAC addresses of the local nodes of the LAN. In one embodiment, each PE device publishes its own virtual MAC addresses in the provider network to other PE devices.

Each PE device is responsible for mapping between the virtual MAC address assigned to an interface and the physical MAC addresses of the local nodes of the LAN on that interface. Thus, the traffic between two PE devices utilize the virtual MAC addresses assigned by these two PE devices in the provider network. As a result, the virtual MAC address used by a PE device serves as a proxy address for the physical MAC addresses of the local nodes of the associated LAN on the PE device in view of the provider network. Therefore, each PE device only maintains physical MAC address information of its local nodes, plus the virtual MAC addresses of other PE devices in the provider network. A PE device does not have to maintain MAC address information of other remote nodes of other LAN segments associated with other PE devices. As a result, the size of the MAC table of each PE will be significantly reduced and the speed to look up in the MAC table will increase.

Figure 1:
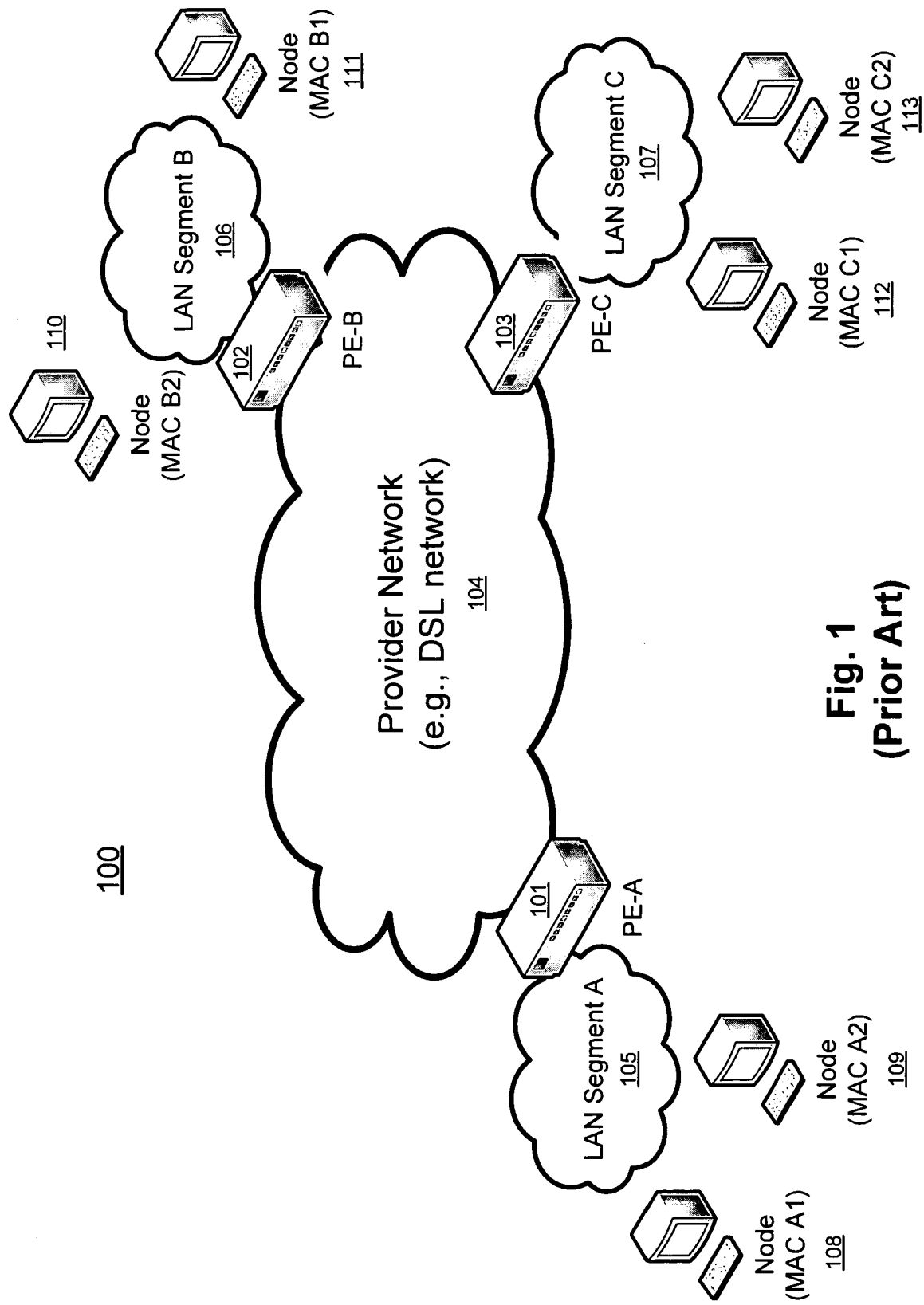
FIG. 1 is a block diagram illustrating a typical network configuration.
Figure 2:
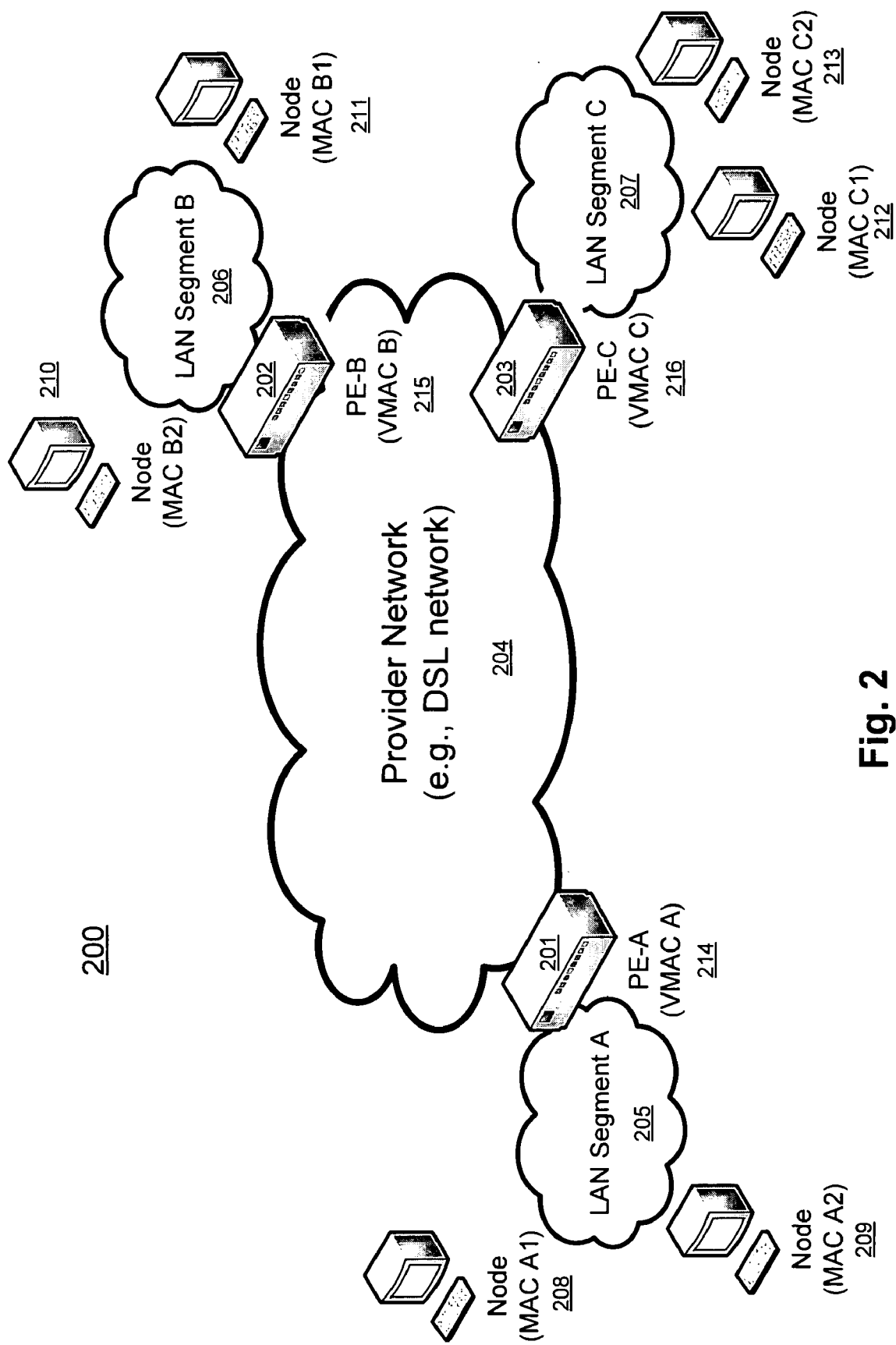
FIG. 2 is a block diagram illustrating network configuration according to one embodiment of the invention.

FIG. 2 is a block diagram illustrating network configuration according to one embodiment of the invention. Referring to FIG. 2, similar to network configuration 100 of FIG. 1, network configuration 200 includes, but is not limited to, PE devices 201-203 for bridging LAN segments 205-207 respectively with provider network 204, which may be a VPLS compatible network or utilize other mechanisms to transport layer 2 data. For example, any one of PE devices 201-203 may be a SmartEdge PE compatible device available from Redback Networks of San Jose, Calif. Each of the LANs 205-207 may include one or more local nodes 208-213. Each local node will be represented by a respective physical MAC address.

In this example, local nodes 208-209 have physical MAC addresses MAC A1 and MAC A2 respectively. Similarly, local nodes 210-211 have physical MAC addresses MAC B1 and MAC B2 respectively, and local nodes 212-213 have physical MAC addresses MAC C1 and MAC C2 respectively. Note that the network configuration 200 is described for the purposes of illustration only. It will be appreciated that more or fewer local nodes, LANs, and/or PEs may also be implemented. Further, throughout this application VPLS is used as an example of a provider network; however, it is not so limited. Other types of networks may also be applied for the purpose of transporting layer 2 data.

In addition, according to one embodiment of the invention, each PE devices 201-203 may be assigned or associated with one virtual MAC address per access interface per bridge instance on that PE device distributed using the provider network 204 to other PE devices in the same bridge instance. In this example as shown in FIG. 2, assuming only one access interface per bridge instance on each PE device, PE devices 201-203 are associated with virtual MAC addresses 214-216 respectively. Each PE device will publish its virtual MAC address in the provider network 204 to other PE devices that share the same bridge instance. In one embodiment, each of the virtual MAC addresses should be unique in view of the provider network for a given bridge instance. For example, PE device 201 publishes virtual MAC address 214 to PE devices 202-203. In one embodiment, the communications among the PE devices 201-203 are based on the virtual MAC addresses 214-216 as source and/or destination MAC addresses. Thus, each PE device only need to maintain the virtual MAC addresses of other PE devices of the provider network and its local nodes, without having to know the physical MAC addresses of the remote nodes.

For examples, PE device 201 only needs to maintain in a MAC table information regarding the physical MAC addresses of local nodes 208-209. In addition, PE device 201 also maintains virtual MAC addresses 215-216 of remote PE devices 202-203. However, PE device 201 does not need to maintain physical MAC addresses of the remote nodes 210-213 associated with PE devices 202-203 respectively. In effect, the virtual MAC addresses of PE devices 202-203 serves as a proxy address for the physical MAC addresses of remote nodes 210-213 respectively. As a result, the size of the MAC table maintained by each of the PE devices 201-203 may be significantly reduced and the speed to look up in a MAC table of a PE device may be increased. One reason for improvement in lookup speed is due to the fact that the format/structure of the virtual MAC address is an implementation issue since the scope of the MAC address is local to a specific bridge instance. Consequently, the virtual MAC address can be structured so as to facilitate easy lookup (e.g., simple indexing schemes may be developed based on a few bits of the MAC address).

For the purposes of illustration, when node 208 of LAN segment 205 sends a packet to node 210 of LAN segment 206, the packet is received at PE device 201 of LAN segment 205. In response to the packet, according to one embodiment, PE device 201 looks up in a table maintained within PE device 201 (on a per interface basis for a specific bridge instance) to obtain its own virtual MAC address 214 (e.g., VMAC A). PE device 201 then replaces the source MAC address of the packet with its own virtual MAC address 214. Thereafter, PE device 201 looks up the destination MAC address in the packet in its MAC table to find the destination PE device to send the packet to. This will result in the modified packet being sent to PE device 202.

Upon receiving the packet at PE device 202, PE device 202 looks up in a MAC table maintained within PE device 202 to determine which one of the nodes 210-211 is the destination of the packet. In one embodiment, PE device 202 may utilize ARP (address resolution protocol) techniques to determine the destination MAC address to be used for sending the packet to node 210. Alternatively, PE device 202 may further maintain a mapping table, by monitoring received traffic, for mapping IP addresses in the received packets to the MAC addresses for each of the local nodes 210-211. Thus, based on the destination IP address of the packet, PE device 202 may determine the physical MAC address of the destination node, in this case, node 210. Thereafter, PE device 202 replaces the destination MAC address in the received packet with the MAC address of node 210 based on the lookup operation of mapping between an IP address and a MAC address. The packet is then forwarded to node 210.

Figure 3:
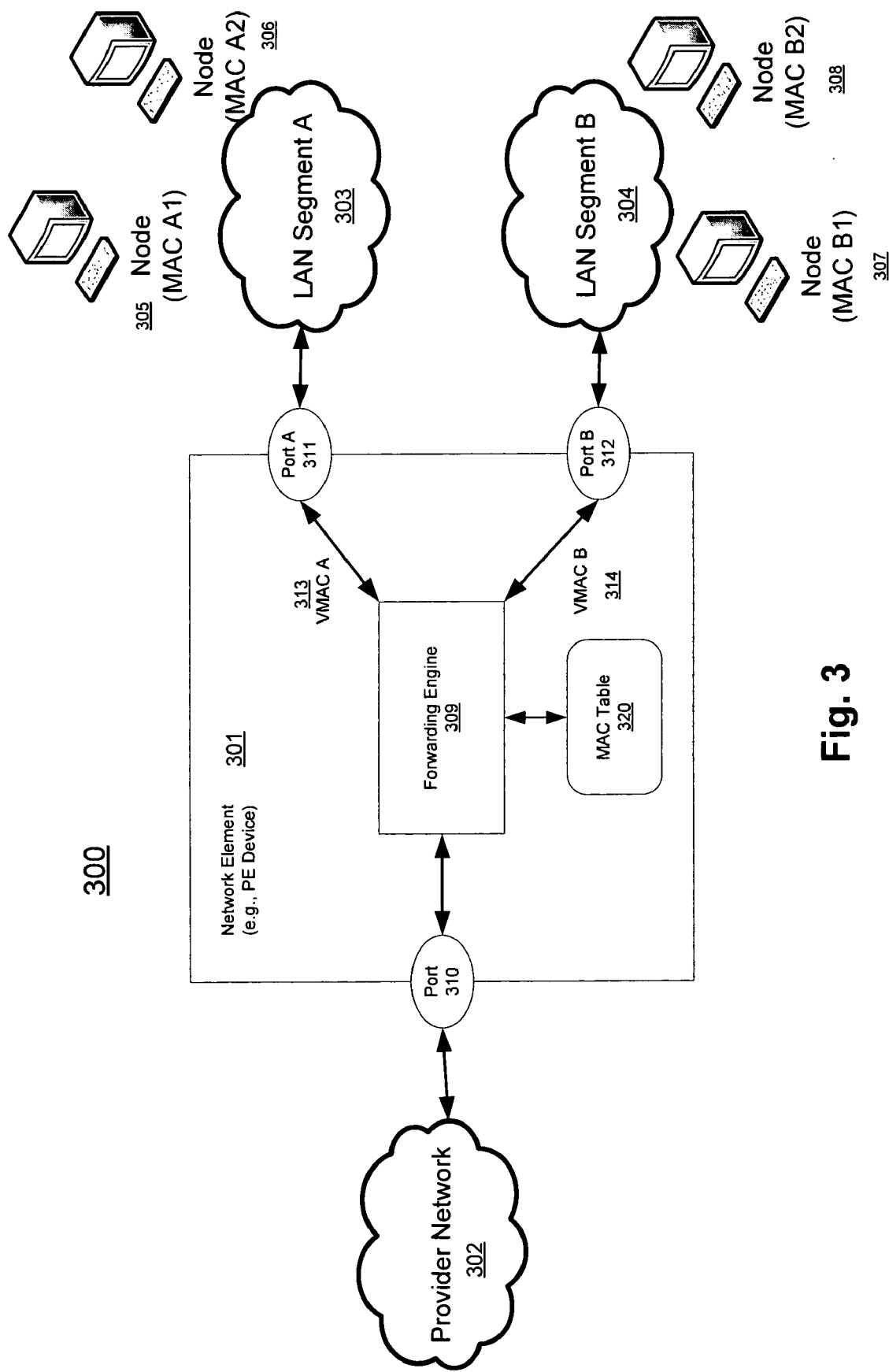
FIG. 3 is a block diagram of a PE device configuration according to one embodiment of the invention.

FIG. 3 is a block diagram of a PE device configuration according to one embodiment of the invention. For example, PE device 301 may be one of the PE devices 201-203 of FIG. 2. In one embodiment, an example PE device includes, but is not limited to, a trunk interface coupled to a provider network, an access interface coupled to a local area network (LAN), and a forwarding engine coupled to the trunk interface and the access interface to, in response to a first packet received from a first local node over the LAN via the access interface and destined to a first remote node over the provider network, replace a source MAC (media access control) address of the first packet with a virtual MAC address associated with the received interface for specific bridge instance on a PE device, and to transmit the first packet having the virtual MAC address as the source MAC address to the first remote node over the provider network via the trunk interface.

Figure 4A:
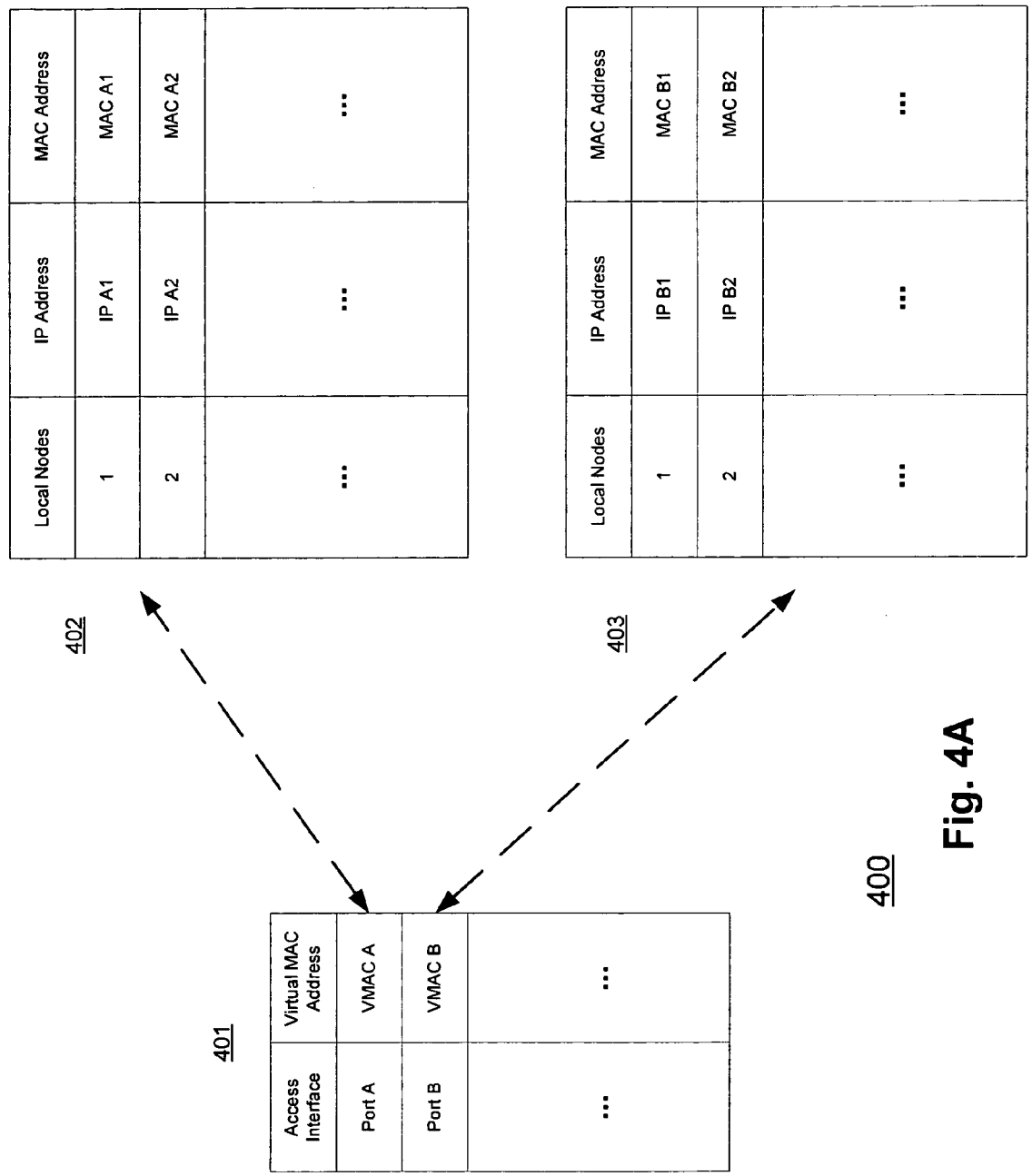
FIG. 4A is a block diagram illustrating an example of a MAC table according to one embodiment of the invention.

Referring to FIG. 3, PE device 301 includes a trunk interface 310 coupled to a provider network 302 and access interfaces 311-312 coupled to LAN segment 303 and LAN segment 304 respectively. PE device 301 further includes a forwarding engine 309 to forward packets between trunk interface 310 and access interfaces 311-312, based on the mapping information stored in a MAC table 320. Note that the forwarding engine 309 may be implemented in software, hardware, or a combination of both. An example of MAC table 320 is shown in FIG. 4A.

In this example, since PE device 301 includes two access interfaces 311 and 312, two virtual MAC addresses 313 and 314 may be assigned to the access interfaces 311-312. The virtual MAC addresses 313 and 314 may be published by the PE device 301 to other PE devices in the provider network 302. In addition, between the access interfaces 311 and 312, their respective virtual MAC addresses may be published to each other. As a result, virtual MAC address 313 proxies the physical MAC addresses of local nodes 305-306 of LAN 303, while virtual MAC address 314 proxies the physical MAC addresses of local nodes 307-308 of LAN 304.

In one embodiment, MAC table 320 may be shared by the access interfaces 311-312. Alternatively, each line card associated with the access interfaces 311-312 maintains its own MAC table that is responsible for mapping the corresponding virtual MAC address and the physical MAC addresses of the associated local nodes. In this configuration, for example, the line card associated with the access interface 311 may maintain its own virtual MAC address 313, the virtual MAC address 314 of the line card associated with the access interface 312, and the virtual MAC addresses of other PE devices of the provider network 302, as well as the physical MAC addresses of the associated local nodes 305-306.

Likewise, the line card associated with the access interface 312 may maintain its own virtual MAC address 314, the virtual MAC address 313 of the line card associated with the access interface 311, and the virtual MAC addresses of other PE devices of the provider network 302, as well as the physical MAC addresses of the associated local nodes 307-308. Other configurations may exist. Note that the configuration 300 of FIG. 3 is shown for the purposes of illustration only. More or fewer access interfaces may also be implemented.

FIG. 4A is a block diagram illustrating an example of a MAC table according to one embodiment, which may be used as part of Mac table 320 of FIG. 3. Referring to FIG. 4A, according to one embodiment, exemplary configuration 400 includes a virtual MAC (VMAC) table 401 and MAC tables 402 and 403, each corresponding to an access interface (e.g., access interfaces 311 and 312 of FIG. 3. Note that for the purposes of illustration only, two access interfaces are used as examples. More or less access interfaces, as well as the corresponding MAC tables may also be implemented.

In this example, referring to FIGS. 3 and 4A, VMAC table 401 may be used by the forwarding engine 309 to determine which of the access interfaces 311-312 that an incoming packet belongs to. Once the destination access interface has been determined, the corresponding MAC table associated with the determined access interface may be used to determined the MAC address of the final destination local node. For example, based on the destination MAC address of an incoming packet (e.g., virtual MAC address as the destination MAC address), VMAC table 401 is used to determine which of the MAC tables 402-403 may be utilized. For the purposes of illustration, it is assumed that the destination MAC address of the incoming packet is VMAC A. As a result, MAC table 402 corresponding to VMAC A is retrieved and used to determine physical MAC address of the destination local node, for example, based on the destination IP address of the incoming packet.

Figure 4B:
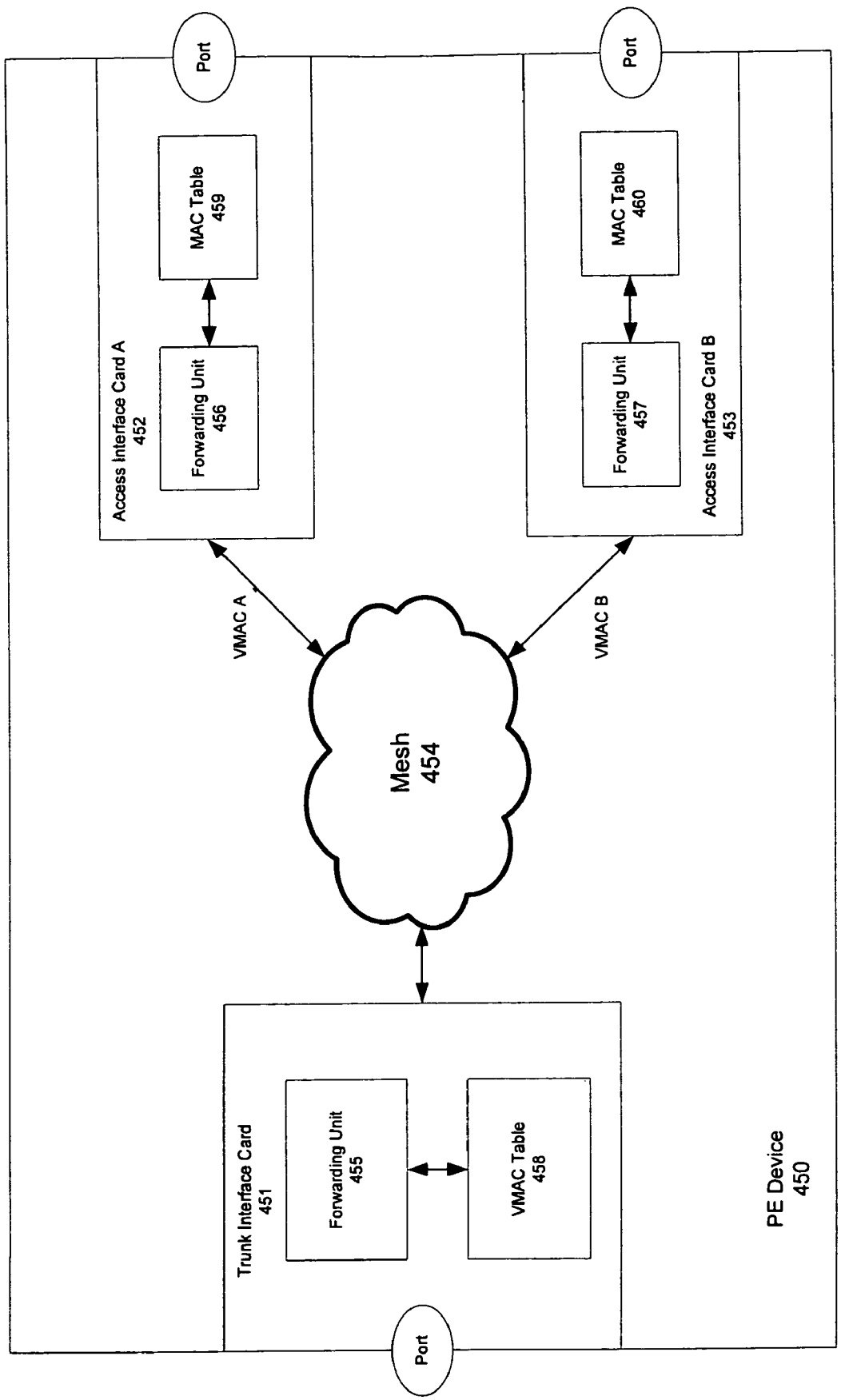
FIG. 4B is a block diagram of a PE device configuration according to an alternative embodiment of the invention.

FIG. 4B is a block diagram of a PE device configuration according to an alternative embodiment of the invention. In this embodiment, the forwarding functionalities and the MAC tables are maintained by the corresponding line cards. Referring to FIG. 4B, in one embodiment, PE device 450 includes a trunk interface card 451 having its own forwarding unit 455 coupled to a virtual MAC table 458. PE device 450 further includes one or more access interface cards 452-453, each corresponding to an access interface and each maintaining its corresponding forwarding unit 456 or 457 and the corresponding MAC table 459 or 460, respectively. Dependent upon the number of access interfaces maintained by the PE device 450, more or less access interface cards may be implemented. The trunk interface card 451 and the access interface cards 452-453 are coupled to one another via mesh 454.

Each of the access interface is assigned or associated with a virtual MAC address. Note that an access interface card may include multiple access interfaces or ports. If one access interface card includes only one access interface, one virtual MAC address is assigned to the access interface card. If multiple access interfaces are associated with one access interface card, multiple virtual MAC addresses may be associated with the corresponding access interface card. Note that the term interface here refers to both physical interfaces (ports) and/or logical interfaces (e.g., VLANs, PVC's etc.). Other configurations may exist.

Referring to FIGS. 4A and 4B, according to one embodiment, VMAC table 458 may be implemented as part of VMAC table 401 of FIG. 4A. MAC table 459 may be implemented as part of MAC table 402 of FIG. 4A and similarly, MAC table 460 may be implemented as part of MAC table 403 of FIG. 4A. Forwarding unit 456 of access interface card 452 is responsible for mapping, via MAC table 459, the associated virtual MAC address and the physical MAC addresses of the local nodes coupled to the corresponding access interface. Likewise, forwarding unit 457 of access interface card 453 is responsible for mapping, via MAC table 460, the associated virtual MAC address and the physical MAC addresses of the local nodes coupled to the corresponding access interface. Other configurations may exist.

As described above, the techniques set forth throughout this application can be applied to a variety of networks. For example, the techniques described herein can be applied to a VPLS compatible network. In this example, each PE will only export one unique virtual MAC address per access interface per VPLS instance. This implies that all MAC's behind a single access interface will be aggregated and advertised as a single proxied virtual MAC to:

the other remote PE devices of the VPLS instance and
to other line cards on the same PE device.

The primary benefit of the above is to achieve a significant reduction in the size of the MAC tables and to virtually eliminate the need for MAC learning. In a traditional VPLS implementation, each PE device that is participating in a VPLS instance will need to keep track of all the MAC entries for that VPLS instance (e.g., both local and remote MAC's). With certain embodiments of the invention, each PE device only needs to keep track of only its local MAC entries similar to those described above. That is, entries from remote PE's will be aggregated into a few virtual MAC addresses. Furthermore, each line card only needs to keep track of MAC entries learnt via its local interfaces. That is, MAC entries from other line cards on the same PE will also be aggregated into a few virtual MAC addresses similar to those described above.

In the case of a single flat Ethernet network with no routers, there is no MAC based learning required (e.g., MAC learning can be disabled). At initialization time, according to one embodiment of the invention, the bridge daemon can instantiate one virtual MAC address per access interface that is a member of a given VPLS instance and propagate it to all member line cards and the trunk card. In addition, according to one embodiment, a special gratuitous ARP packet (e.g., source/dest IP=0.0.0.0 or broadcast) is sent to all remote PE's with the virtual MAC address. Alternately, LDP extensions to signal virtual MAC addresses may be utilized. This will trigger the remote PE devices to update their MAC tables, for example, with the <virtual MAC address, remote PE/pseudowire> binding. As a result, in this scenario, the MAC tables corresponding to a VPLS instance will only contain the virtual MAC addresses.

When an access interface is coupled to a CE router, ARP resolution for IP addresses behind the router (from the routed network) may fail. In this case, according to certain embodiments of the inventions, there are two possible options to disable the proxying of MAC addresses on access interfaces connected to routers:

Use a configuration option to enable/disable MAC proxying

Utilize a heuristic algorithm based on number of ARP failures

MAC address learning will need to be enabled in this case. If it is known at provisioning time that the number of nodes behind the CE router are within a predetermined limit, then proxying could still be done—however, in this case, the binding between IP addresses and MAC addresses will have to be created by monitoring traffic received on that interface (e.g., ARP is not an option for address resolution).

While forwarding traffic from an access interface to a trunk interface, according to one embodiment, the forwarding engine of the line card hosting the access circuit may replace the source MAC address of all packets (including ARP packets) with the virtual address assigned for the access interface before forwarding the Ethernet frame. The destination MAC address may be looked up in the VPLS/Bridge MAC table to find the next hop/adjacency for the packet. In one embodiment, the VPLS MAC table may be limited to only the virtual MAC addresses learned from other PE's and other line cards.

While forwarding traffic from a trunk interface to an access interface, according to one embodiment, the forwarding engine receives an Ethernet frame over a pseudo wire (in case of VPLS) with the destination MAC address equal to one of the virtual MAC addresses for the VPLS instance. The encoding of the virtual MAC address could be designed to facilitate easy lookup of the egress slot/interface. On the access card, according to one embodiment, the destination IP address in the Ethernet frame would be looked up in the ARP table to resolve the IP address to the real corresponding MAC address. An ARP request would be generated if the ARP entry does not exist.

To handle non-IP traffic, Ethernet traffic for non-IP protocols (detected by monitoring the ethertype field) will not have their source MAC address proxied. This case reverts to typical VPLS processing with MAC learning for each MAC that is part of a non-IP traffic flow. IP traffic may continue to have the source MAC proxied as before.

In one embodiment, a virtual MAC address to be assigned to a PE device may need to satisfy the following conditions:

Must be guaranteed to be unique across all the real and virtual MAC's in a given VPLS instance Uniqueness across VPLS instances is not required.

Must be able to easily infer the egress slot/circuit based on MAC address

Note that these techniques do not depend on the remote PE supporting this mechanism and hence has no interoperability issues. However, if the remote PE does not support this mechanism, MAC learning must be enabled.

Figure 5:
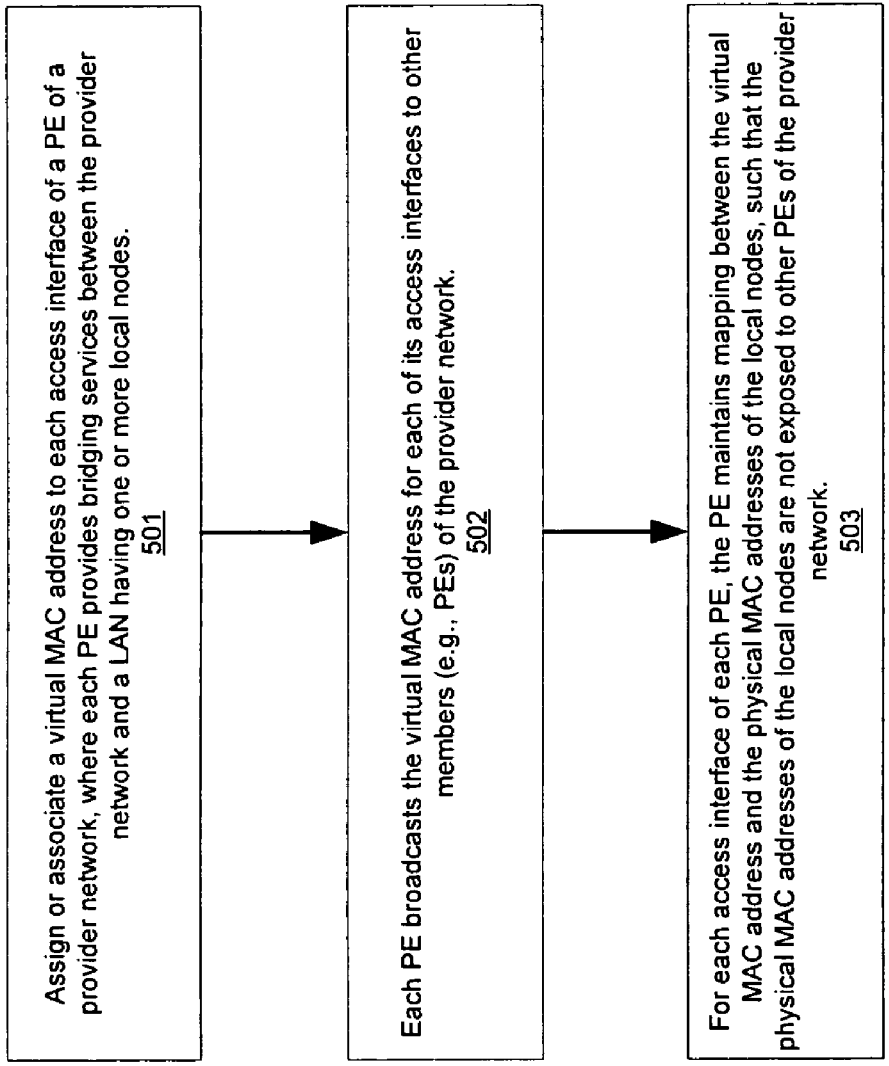
FIG. 5 is a flow diagram illustrating a process of mapping between a virtual MAC address and physical MAC addresses, according to one embodiment of the invention.

FIG. 5 is a flow diagram illustrating a process of mapping between a virtual MAC address and physical MAC addresses, according to one embodiment of the invention. Note that process 500 may be performed by a processing logic which may be implemented in software, hardware, or a combination of both. For example, process 500 may be performed by forwarding engine 309 of FIG. 3.

Referring to FIG. 5, at block 501, processing logic assigns or associates a virtual MAC address to each access interface of a PE device of a provider network, where each PE device provides bridging services between the provider network and a LAN having one or more local nodes. At block 502, each PE device may publish or broadcast its own virtual MAC address to other PE devices of the provider network. At block 503, for each access interface of a PE device, the PE device maintains mapping between the virtual MAC address and the <IP Address, physical MAC addresses> of the local nodes, such that the physical MAC addresses of the local nodes are not exposed to other PE devices of the provider network. Other operations may also be performed.

Figure 6:
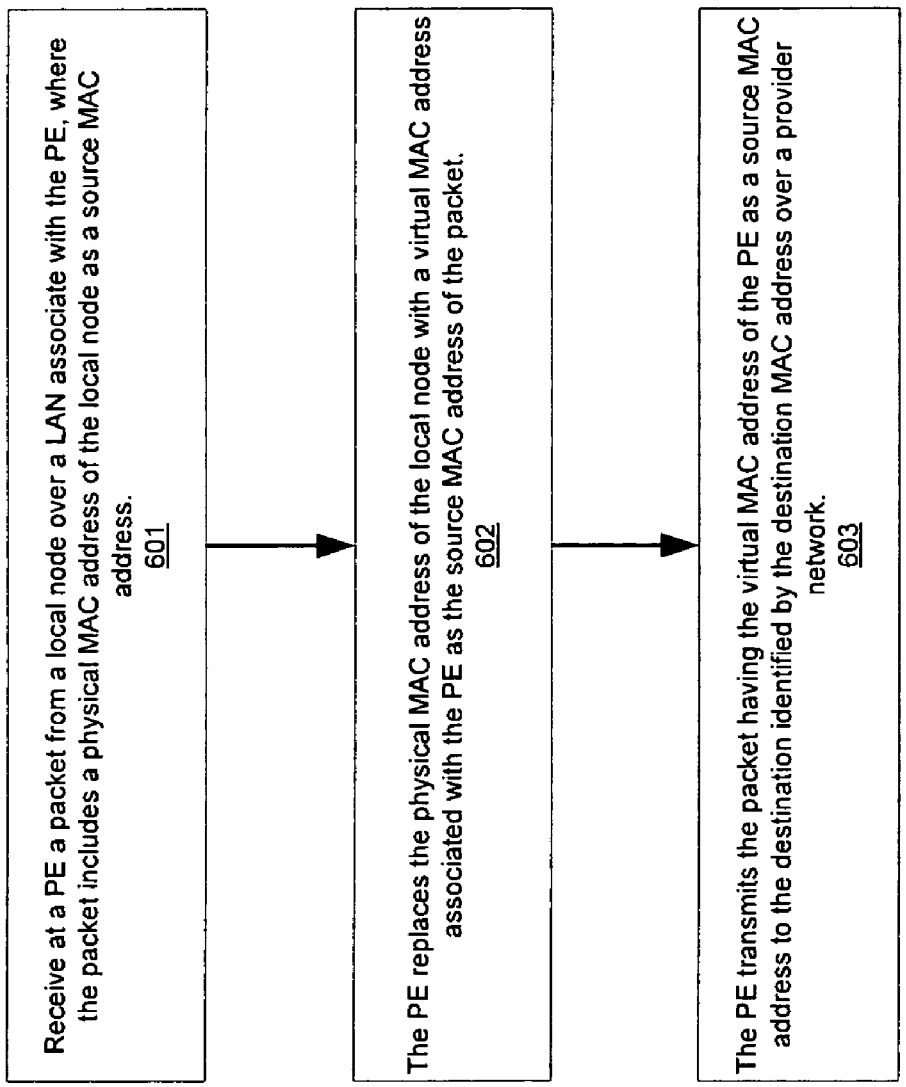
FIG. 6 is a flow diagram illustrating a process for forwarding packets from an access interface to a trunk interface, according to one embodiment of the invention.

FIG. 6 is a flow diagram illustrating a process for forwarding packets from an access interface to a trunk interface, according to one embodiment of the invention. Note that process 600 may be performed by a processing logic which may be implemented in software, hardware, or a combination of both. For example, process 600 may be performed by forwarding engine 309 of FIG. 3.

Referring to FIG. 6, at block 601, a PE device receives a packet from a local node over a LAN associated with the PE device, where the packet includes a physical Mac address of the local node as a source MAC address. At block 602, the PE device replaces the physical MAC address of the local node with a virtual MAC address associated with the PE as the source MAC address of the packet. At block 603, the PE device transmits the packet having the virtual MAC address of the PE as a source MAC address to the destination identified by the destination MAC address over a provider network. In one embodiment, the destination MAC address may be a virtual MAC address of a remote PE device associated with the destination node.

Figure 7:
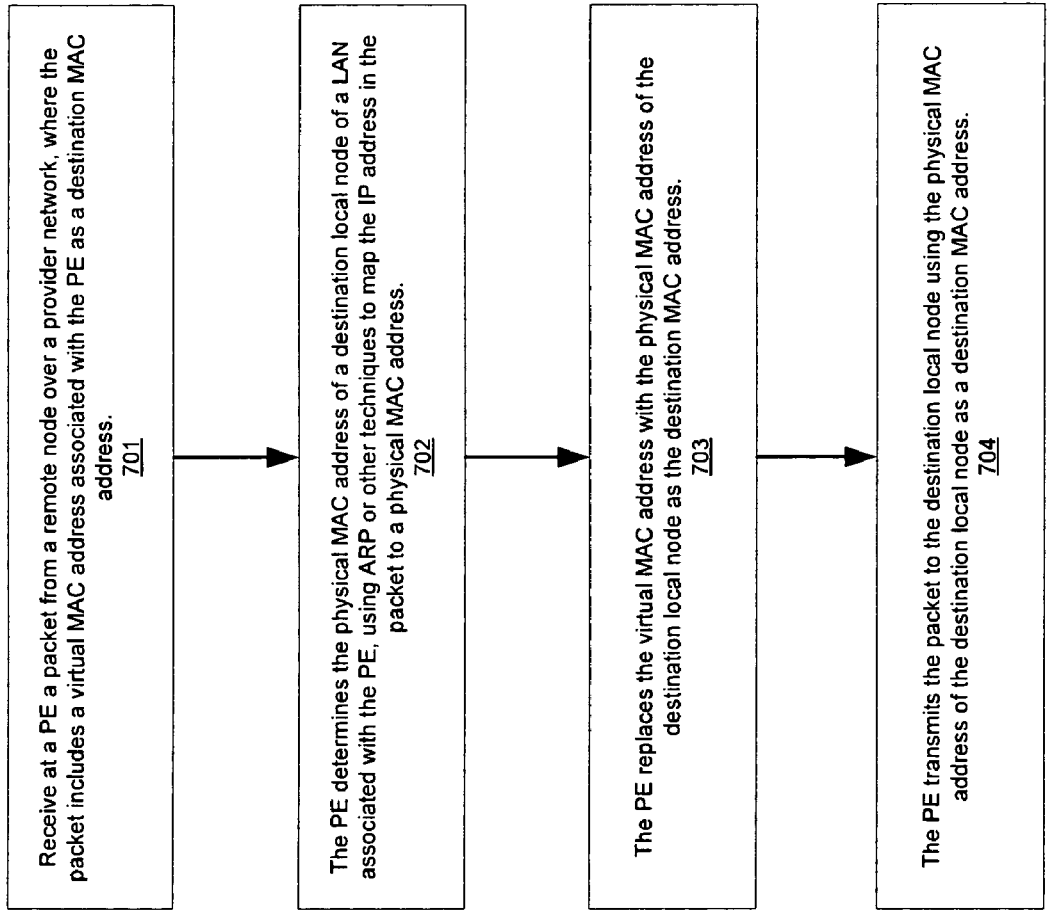
FIG. 7 is a flow diagram illustrating a process or forwarding packets from a trunk interface to an access interface, according to one embodiment of the invention.

FIG. 7 is a flow diagram illustrating a process or forwarding packets from a trunk interface to an access interface, according to one embodiment of the invention. Note that process 700 may be performed by a processing logic which may be implemented in software, hardware, or a combination of both. For example, process 700 may be performed by forwarding engine 309 of FIG. 3.

Referring to FIG. 7, at block 701, a PE device receives a packet from a remote node over a provider network, where the packet includes a virtual MAC address associated with the PE device as a destination MAC address. In one embodiment, the source MAC address of the packet is a virtual MAC address of a PE device associated with a remote node originating the packet. At block 702, the PE device determines the physical MAC address of a destination local node of a LAN associated with the PE device. In one embodiment, the physical MAC address of the destination local node may be determined based on the mapping information maintained within a MAC table, similar to one shown in FIG. 4A. At block 703, the PE device replaces the virtual MAC address with the physical MAC address of the destination local node as the destination MAC address. Thereafter, at block 704, the PE device transmits the packet to the destination local node using the physical MAC address of the destination local node as a destination MAC address. Other operations may also be performed.

Thus, scalable data forwarding techniques in a switched network have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine implemented method, comprising:
   receiving, by a provider edge (PE) device of a provider network, a plurality of packets from a plurality of local nodes over a plurality of local area networks (LANs), the plurality of packets destined for one or more different remote nodes over the provider network, wherein each of the packets contains a source MAC (media access control) address identifying one of the local nodes as a source, the local nodes are identified by different source MAC addresses, and the PE device is associated with a set of virtual MAC addresses, wherein the PE device comprises a set of access interfaces, each of the access interfaces identified by a different one of the virtual MAC addresses and coupled to a different one of the LANs;
   replacing, by the PE device, each of the different source MAC addresses in the packets with one of the virtual MAC addresses associated with the PE device, wherein all of the different source MAC addresses from a same one of the LANs are replaced by a same one of the virtual MAC addresses;
   transmitting, by the PE device, the packets having the virtual MAC addresses toward the one or more destined remote nodes over the provider network;
   responsive to the PE device receiving a packet from a remote node over the provider network, the packet having one of the virtual MAC addresses of the PE device as a destination MAC address, the PE device performing the following:
      using a subset of bits in the destination MAC address as an index to identify one of a set of data structures, each of the data structures storing a mapping for a different one of the LANs between Internet Protocol (IP) addresses and physical MAC addresses of the local nodes; and
      determining that one of the local nodes is a destination of the packet based on the mapping stored in the identified data structure.

2. The method of claim 1, wherein after determining that one of the local nodes is the destination of the packet, the PE device performs the following:
   replacing the destination MAC address of the packet with a physical MAC address of the determined local node; and
   transmitting the packet to the determined local node over the local network.

3. The method of claim 2, further comprising the PE device publishing the virtual MAC addresses in the provider network without exposing physical MAC addresses of the local nodes of the LANs to remote PE devices or remote end nodes.

4. The method of claim 3, further comprising maintaining relationships between the virtual MAC addresses of the PE device and the physical MAC addresses of the plurality of local nodes.

5. The method of claim 3, wherein determining the one of the plurality of local nodes as the destination of the packet comprises:
   determining a destination IP address of the packet; and
   performing a lookup operation in a database to determine the physical MAC address of the local node based on the destination IP address.

6. The method of claim 5, further comprising maintaining within the PE device mapping information between an IP address and a physical MAC address of each local node associated with each of the LANs.

7. The method of claim 3, wherein the PE device comprises a first access interface coupled to a first LAN and a second access interface coupled to a second LAN, and wherein the method further comprises:
   associating a first virtual MAC address with the first access interface;

associating a second virtual MAC address with the second access interface;

maintaining a first relationship between the first virtual MAC address and physical MAC addresses of local nodes of the first LAN;

maintaining a second relationship between the second virtual MAC address and physical MAC addresses of local nodes of the second LAN; and distributing the first and second virtual MAC addresses to other PE devices of the provider network using gratuitous ARP (address resolution protocol).

8. The method of claim 1, wherein the provider network is a VPLS (virtual private LAN service) compatible network.

9. A non-transitory tangible machine-readable medium having instructions, which when executed, cause a machine to perform a method for routing data, the method comprising:

receiving, by a provider edge (PE) device of a provider network, a plurality of packets from a plurality of local nodes over a plurality of local area networks (LANs), the plurality of packets destined for one or more different remote nodes over the provider network, wherein each of the packets contains a source MAC (media access control) address identifying one of the local nodes as a source, the local nodes are identified by different source MAC addresses, and the PE device is associated with a set of virtual MAC addresses, wherein the PE device comprises a set of access interfaces, each of the access interfaces identified by a different one of the virtual MAC addresses and coupled to a different one of the LANs;

replacing, by the PE device, each of the different source MAC addresses in the packets with one of the virtual MAC addresses associated with the PE device, wherein all of the different source MAC addresses from a same one of the LANs are replaced by a same one of the virtual MAC addresses;

transmitting, by the PE device, the packets having the virtual MAC addresses toward the one or more destined remote nodes over the provider network;

responsive to the PE device receiving a packet from a remote node over the provider network, the packet having one of the virtual MAC addresses of the PE device as a destination MAC address, the PE device performing the following:

using a subset of bits in the destination MAC address as an index to identify one of a set of data structures, each of the data structures storing a mapping for a different one of the LANs between Internet Protocol (IP) addresses and physical MAC addresses of the local nodes; and determining that one of the local nodes is a destination of the packet based on the mapping stored in the identified data structure.

10. The non-transitory tangible machine-readable medium of claim 9, wherein after determining that one of the local nodes is the destination of the packet, the method further comprises:

replacing the destination MAC address of the packet with a physical MAC address of the determined local node; and transmitting the packet to the determined local node over the local network.

11. The non-transitory tangible machine-readable medium of claim 10, wherein the method further comprises the PE device publishing the virtual MAC addresses in the provider network without exposing physical MAC addresses of the local nodes of the LANs.

12. The non-transitory tangible machine-readable medium of claim 11, wherein the method further comprises maintaining relationships between the virtual MAC addresses of the PE device and the physical MAC addresses of the plurality of local nodes.

13. The non-transitory tangible machine-readable medium of claim 11, wherein determining the one of the plurality of local nodes as the destination of the packet comprises:

determining a destination IP address of the packet; and performing a lookup operation in a database to determine the physical MAC address of the local node based on the destination IP address.

14. The non-transitory tangible machine-readable medium of claim 13, wherein the method further comprises maintaining within the PE device mapping information between an IP address and a physical MAC address of each local node associated with each of the LANs.

15. The non-transitory tangible machine-readable medium of claim 11, wherein the PE device comprises a first access interface coupled to a first LAN and a second access interface coupled to a second LAN, and wherein the method further comprises:

associating a first virtual MAC address with the first access interface;

associating a second virtual MAC address with the second access interface;

maintaining a first relationship between the first virtual MAC address and physical MAC addresses of local nodes of the first LAN;

maintaining a second relationship between the second virtual MAC address and physical MAC addresses of local nodes of the second LAN; and distributing the first and second virtual MAC addresses to other PE devices of the provider network, using gratuitous ARP (address resolution protocol).

16. The non-transitory tangible machine-readable medium of claim 9, wherein the provider network is a VPLS (virtual private LAN service) compatible network.

17. A provider edge (PE) device, comprising:

a trunk interface coupled to a provider network;

a plurality of access interface coupled to a plurality of local area networks (LANs), over which the access interfaces are adapted to receive a plurality of packets from a plurality of local nodes, wherein each of the packets contains a source MAC (media access control) address identifying one of the local nodes as a source, the local nodes are identified by different source MAC addresses, and the PE device is associated with a set of virtual MAC addresses, wherein each of the access interfaces identified by a different one of the virtual MAC addresses and coupled to a different one of the LANs; and a forwarding engine coupled to the trunk interface and the access interfaces, the forwarding engine adapted to replace each of the different source MAC addresses in the packets with one of the virtual MAC address associated with the PE device, and transmit the packets having the virtual MAC addresses toward one or more destined remote nodes over the provider network via the trunk interface, wherein all of the different source MAC addresses from a same one of the LANs are replaced by a same one of the virtual MAC addresses;

responsive to receipt of a packet from a remote node over the provider network via the trunk interface, the packet having one of the virtual MAC addresses of the PE device as a destination MAC address, the forwarding engine is further adapted to:

use a subset of bits in the destination MAC address as an index to identify one of a set of data structures, each of the data structures storing a mapping for a different one of the LANs between Internet Protocol (IP) addresses and physical MAC addresses of the local nodes; and determine that one of the local nodes is a destination of the packet based on the mapping stored in the identified data structure.

18. The PE device of claim 17, wherein the forwarding engine is further configured to replace the destination MAC address of the packet with a physical MAC address of the determined local node, and transmit the packet to the determined local node over the local network via the access interface.

19. The PE device of claim 18, wherein the virtual MAC address is published in the provider network without exposing physical MAC addresses of the local nodes of each of the LANs to remote PE devices or remote end nodes.

20. The PE device of claim 19, further comprising a database to maintain relationships between the virtual MAC addresses of the access interfaces and the physical MAC addresses of the plurality of local nodes.

* * * * *

UNITED STATES PATENT AND TRADEMARK OFFICE
CERTIFICATE OF CORRECTION

| | |
|---|---|
| PATENT NO. | : 8,144,698 B2 |
| APPLICATION NO. | : 11/450027 |
| DATED | : March 27, 2012 |
| INVENTOR(S) | : Sargor et al. |

It is certified that error appears in the above-identified patent and that said Letters Patent is hereby corrected as shown below:

In Column 12, Line 11, in Claim 13, delete "perfoiming" and insert -- performing --, therefor.

Signed and Sealed this
Twenty-sixth Day of June, 2012

David J. Kappos
*Director of the United States Patent and Trademark Office*